United States Patent
Regan et al.

(10) Patent No.: US 7,708,171 B2
(45) Date of Patent: May 4, 2010

(54) PRESSURE CONTROL DEVICE

(75) Inventors: Philip Malcolm Regan, JE Drunen (NL); Roy Edwin Van Swieten, NH Hedel (NL)

(73) Assignee: IPS Patent AG, Baar (CH)

( * ) Notice: Subject to any disclaimer, the term of this patent is extended or adjusted under 35 U.S.C. 154(b) by 750 days.

(21) Appl. No.: 10/587,810

(22) PCT Filed: Aug. 5, 2004

(86) PCT No.: PCT/IB2004/002522

§ 371 (c)(1),
(2), (4) Date: Dec. 4, 2006

(87) PCT Pub. No.: WO2005/082744

PCT Pub. Date: Sep. 9, 2005

(65) Prior Publication Data

US 2007/0125809 A1    Jun. 7, 2007

(30) Foreign Application Priority Data

Jan. 30, 2004   (EP)   .................................. 04405059

(51) Int. Cl.
*B67D 7/60* (2010.01)
(52) U.S. Cl. .................. 222/389; 222/396; 222/399
(58) Field of Classification Search ............. 222/386.5, 222/389, 396, 399; 137/505.41, 529, 540, 137/571, 906
See application file for complete search history.

(56) References Cited

U.S. PATENT DOCUMENTS

| 3,851,799 | A | | 12/1974 | Paoletti | 222/145 |
|---|---|---|---|---|---|
| 4,456,155 | A | * | 6/1984 | Miyata et al. | 222/396 |
| 5,285,931 | A | * | 2/1994 | Alfons | 222/61 |
| 6,616,017 | B2 | * | 9/2003 | van 't Hoff | 222/389 |
| 2001/0002598 | A1 | * | 6/2001 | Van't Hoff | 137/540 |
| 2003/0075568 | A1 | * | 4/2003 | van 't Hoff | 222/389 |
| 2004/0016777 | A1 | * | 1/2004 | Gupta | 222/389 |
| 2006/0054237 | A1 | * | 3/2006 | Vanblaere et al. | 141/18 |
| 2006/0180615 | A1 | * | 8/2006 | Vanblaere et al. | 222/386.5 |
| 2007/0164039 | A1 | * | 7/2007 | Vanblaere et al. | 220/723 |

FOREIGN PATENT DOCUMENTS

| WO | WO90/15377 | 12/1990 |
|---|---|---|
| WO | WO2004/065217 A2 | 8/2004 |
| WO | WO2004/065260 A1 | 8/2004 |

* cited by examiner

*Primary Examiner*—Kevin P Shaver
*Assistant Examiner*—Andrew P Bainbridge
(74) *Attorney, Agent, or Firm*—McCormick, Paulding & Huber LLP

(57) ABSTRACT

The invention is a pressurized gas providing and gas pressure regulating device. The invention is a container with an over pressurized second chamber of pressurized gas that can be released to the exterior of the container when a valve that is integrally connected to a piston that along with a first cylinder forms a first chamber that is filled with a comparably less over pressurized gas that pushes the valve open when the gas pressure outside of the container is too low, thereby permitting the over pressurized second chamber to fluidly connect via the valve and thereby increase the pressure outside the container, such as to a volume of gas located below a piston within a fluid dispenser, the first and second chambers are shaped as cylinders and the first cylinder fits within the second chamber.

27 Claims, 9 Drawing Sheets

PRESSURE CONTROL DEVICE

CROSS REFERENCE TO RELATED APPLICATIONS

This application is entitled to the benefit of and incorporates by reference essential subject matter disclosed in International Patent Application No. PCT/IB2004/002522 filed on Aug. 5, 2004 and European Patent Application No. 04405059.9 filed Jan. 30, 2004.

FIELD OF THE INVENTION

The present invention concerns pressure control device for maintaining a constant predetermined excess pressure in a fluid dispensing container and a method for manufacturing such a pressure control device.

BACKGROUND OF THE INVENTION

PCT patent application WO-A-99/62791 discloses a fluid dispensing container with a pressure control device. The device described therein is provided for maintaining a constant predetermined pressure in a container which is arranged for dispensing a fluid. The pressure control device has a first chamber and a second chamber, as well as a closing member movable relative to the second chamber for releasing and closing a fluid connection between the first chamber and the container depending on the position of the closing member relative to the second chamber. The first chamber is filled with a gas which, in use, has a higher pressure than the pressure in the container. The second chamber is closed having a gas at a predetermined or reference pressure and is located outside the first chamber. In a first embodiment according to FIG. 2 of WO-A-99/62791, the first chamber is provided as a cup-shaped holder which is placed upside down in the container and has its longitudinal edge joined together with the bottom and the upright sidewall of the vessel or container. In FIG. 3 a second embodiment is shown in which the diameter of cup-like first chamber is much smaller than the inner diameter of the container. The chamber is centrally disposed within the container and joined at its longitudinal edge with the bottom of the container. In FIG. 4 a third embodiment is shown in which the same first chamber as in FIG. 3 is disposed eccentrically with respect to the container. In FIG. 5 a disc is provided slightly below the middle of the height of the vessel and is gas-tightly connected with the inner wall of the vessel through a sealing ring. This disc divides the vessel into two (fixed arranged) parts. A similar construction is shown in FIGS. 6a and 6b. Further, in FIG. 7 the first chamber of pressure control device is designed as a plunger which is sealed to the inner wall of the container with a sealing ring and which can be moved in axial direction within the container. Thus, the plunger divides the container in two parts, wherein the upper part is filled with the fluid to be dispensed. The fluid connection from the first chamber terminates in the lower part. When the pressure in the container drops since fluid has been dispensed by the push button on top of the container, the plunger is moved upwards because of the pressure difference between the lower and the upper part until pressure equilibrium between the lower and the upper part is obtained again. Therefore, the pressure in the lower part has decreased so that the pressure in the second chamber will be higher and the closing member will open the fluid connection between the first chamber and the lower part, so that the pressure in the lower part will rise. The plunger will then be moved upwards again until a pressure equilibrium is achieved corresponding to the predetermined or reference pressure in the second chamber. Finally, in the embodiment according to FIG. 8 the first chamber is of cylindrical design and has an outer diameter corresponding to the inner diameter of the container and thus fitted tightly within the container.

Only the pressure device of FIG. 7 of WO-A-99/62791 is movable in an axial direction. In all other examples the pressure device is fixedly arranged within the container. The complete pressure control device of FIG. 7 is designed as a plunger which functions as a movable piston expelling the dispensing fluid. However, the design of the pressure control device is disadvantageous because of its large dimensions so that less of the container can be used for dispensing fluid.

A further important problem of the above described pressure control devices as a separate module is that the first and second chambers have to be pressurized before mounting in a container. This in practice may be very difficult and costly to achieve e.g. in aluminium aerosol cans where the construction is in one-piece and the production lines run at very high outputs. A further major disadvantage is that it has been shown that the pressure in a separate pressure control device which will be mounted afterwards in a container drops to a large extent during a period of some months which is necessary for storage and distribution in the commercial supply chain. In addition, pressurizing of the pressure control device has to be performed with the fluid connection closed in order to obtain a pressure of the prescribed quantity. Thus the known pressure control devices are not suitable for application in a large industrial scale.

It is therefore an object of the present invention to provide a container with a pressure control device which is simpler in construction and for the manufacturing process, such that the volume of the container can be used to a greater extent. It is another object of the invention to provide a pressure control device for a container which can easily be pressurized after being assembled to the container.

BRIEF SUMMARY OF THE INVENTION

According to the present invention, the above and other objects are accomplished by a pressure control device for use in a pressure control system having a fluid dispensing container for maintaining a constant predetermined excess pressure. The pressure control comprises a cylinder having an open end and a closed end, and a piston movable within the cylinder and defining a first chamber to be filled with a gas for exerting the predetermined excess pressure, a second chamber, a passageway from the second chamber to the outside of the device leading to the fluid dispensing container, and a valve for releasing and closing the passageway. The second chamber is formed by a high-pressure container with a closed end and an open end provided with a rim part. The high-pressure container is filled with a gas at a pressure higher than the predetermined excess pressure. The piston includes means for actuating the valve dependent from the pressure difference between the first chamber and the fluid dispensing container so that if the fluid pressure in the fluid dispensing container drops below the predetermined excess pressure, gas flows from the second chamber to the fluid dispensing container until the container pressure approximately equals the predetermined excess pressure. A closure is mounted to the rim part of the high-pressure container in order to close the second chamber, wherein the first chamber is part of the closure such that the high-pressure container encompasses the cylinder of the first chamber.

The above and other objects are also accomplished by a method of manufacturing a pressure control device in accordance with the present invention comprising forming a first cylinder, and forming the piston, the valve elements, the high-pressure container with the closed end and the rim part at the open end, and the closure out of a synthetic material of high stability. A central opening is formed in the bottom of the high-pressure container and the piston is assembled with a sealing ring in the first cylinder. A gas is filled in the first chamber at a predetermined pressure. The first cylinder is mounted with respect to the valve such that the actuating means of the piston is positioned correctly with respect to the valve. The closure is mounted to the high-pressure container.

A main advantage of the present invention is that the pressure control device can be pressurized after implementation and filling of the liquid dispensing bottle. Since the second chamber is encompassing the first chamber, a very compact pressure control device will be obtained so that the total usable space in the bottle is much larger as in known embodiments. As the pressure control device can be fabricated in advance and can be implemented easily in existing plastic bottles, the existing production and filling procedures for e.g. cosmetic products can be maintained with only little additional arrangements in the production line.

Further advantages of the invention are disclosed in the dependent claims and in the following description in which an exemplified embodiment of the invention is described with respect to the accompanying drawings.

DETAILED DESCRIPTION OF THE INVENTION

Specific numbers dedicated to elements defined with respect to a particular figure will be used consistently in all figures if not mentioned otherwise.

Figure 1:
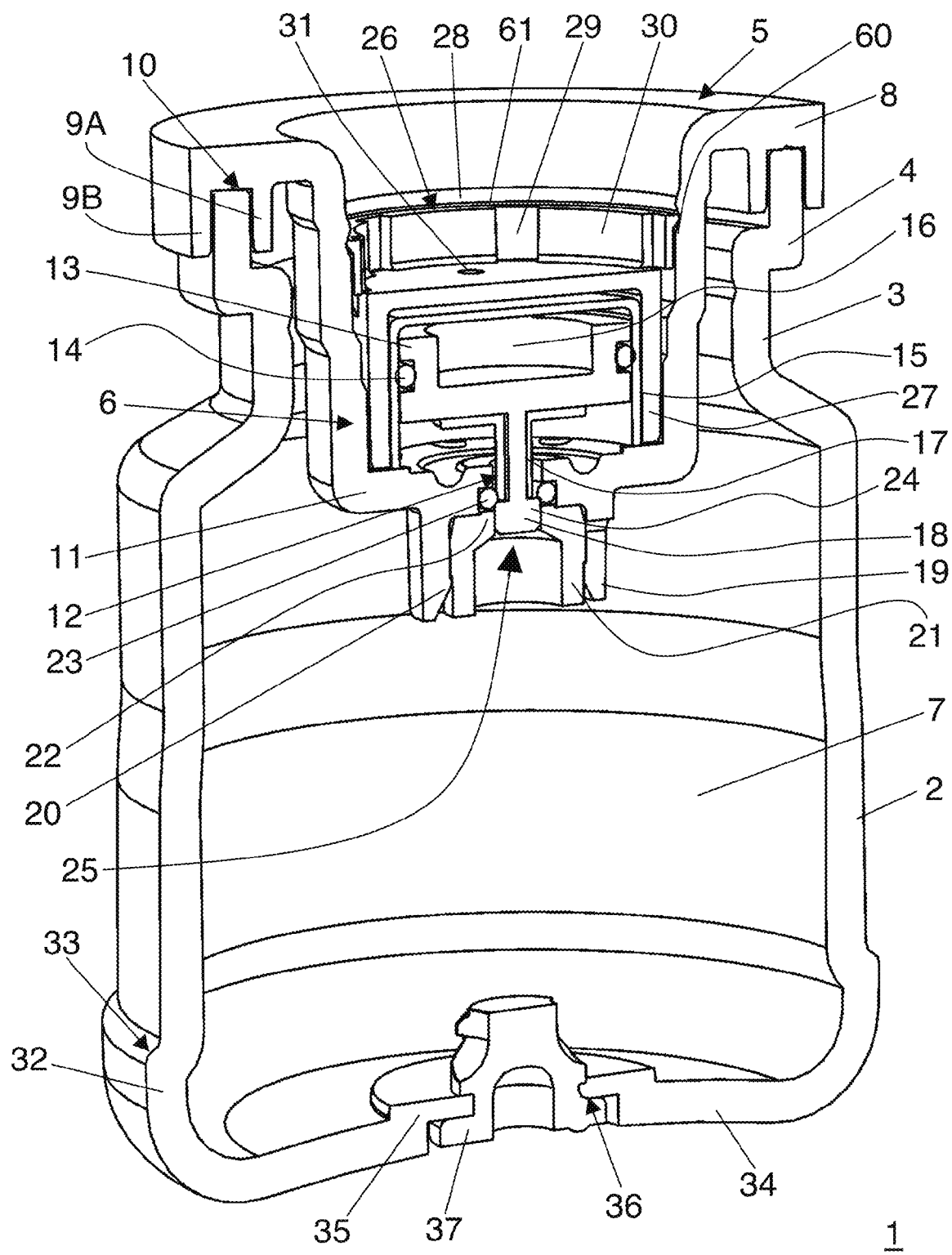
FIG. 1 illustrates a pressure control device of the present invention in perspective view and in cross-section, wherein the valve is closed.
Figure 2:
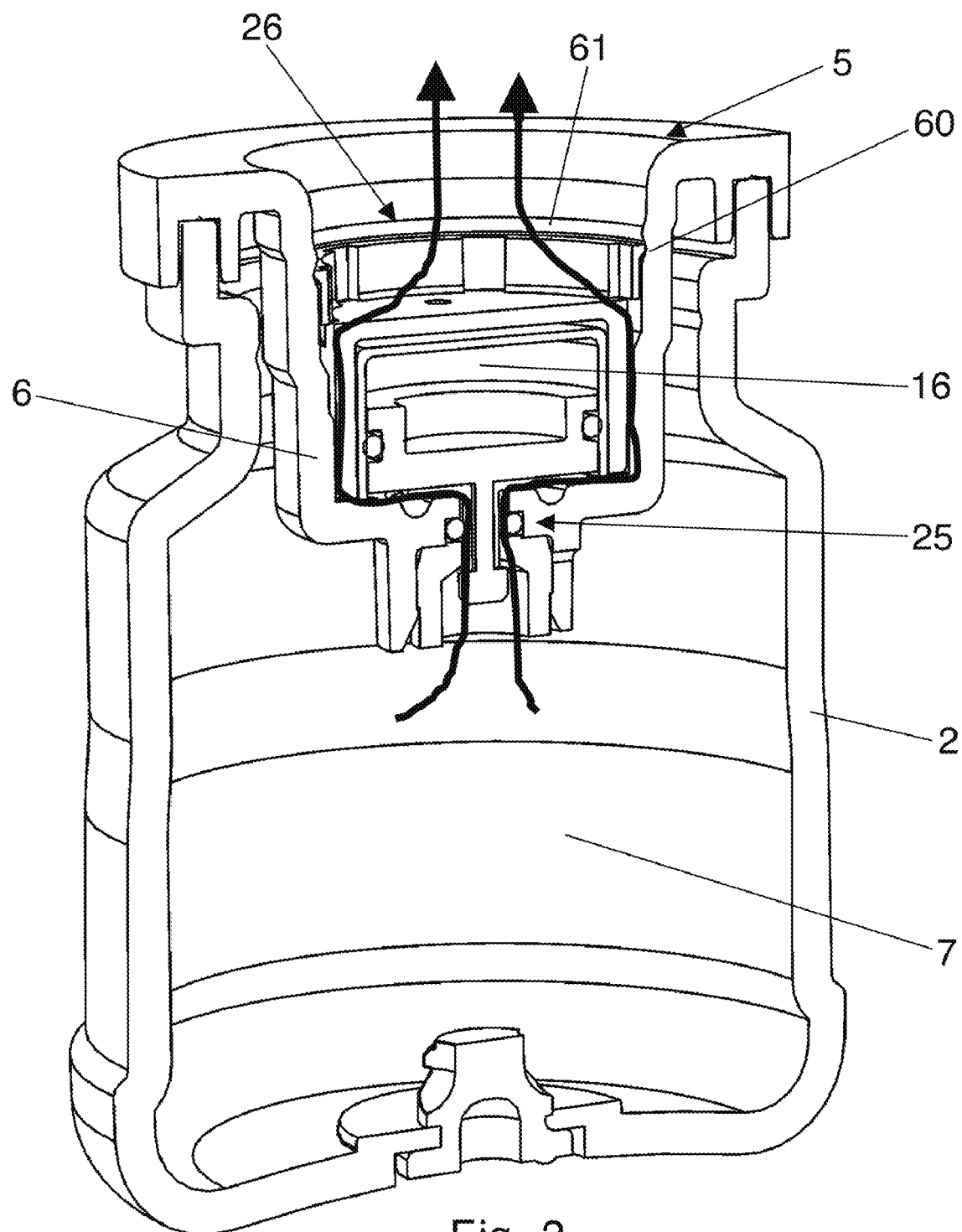
FIG. 2 illustrates the pressure control device of FIG. 1, wherein the valve is open.

In FIGS. 1 and 2 a pressure control device 1 for maintaining a constant predetermined excess pressure in a container is shown in cross-section and in a perspective view. The device 1 consists of a substantially cylindrical container 2 with a tapered neck portion 3 and a flange 4, on which a ring-shaped insert or closure 5 having a steplike funnel 6 is mounted. The cylinder 2—indicated as "the second cylinder" in the claims—forms a second chamber 7 of the pressure control device 1. The outer rim 8 of the insert 5 has an outer downwardly directed ring part 9A and an inner downwardly directed ring part 9B, which ring parts include a groove 10. The insert 5 is mounted to the flange 4 of the cylinder 2 by ultrasonic welding. For that reason the inner surface of the groove 10 of the insert 5 has a saw-tooth or fluted structure used as energy directors during the welding process for a very strong hermetic joint. The lower end 11 of the funnel 6 is closed with a small central opening 12. A cup-like piston 13 with an outer sealing or O-ring 14 is inserted in a cup-like cylinder 15. The space between the piston 13 and the cup-like cylinder 15—indicated as "the first cylinder" in the claims—defines a first chamber 16. The piston 13 has downward a protruding stem 17 with a broader cylindrical end portion 18. The diameter of the central opening 12 is slightly larger than the diameter of the cylindrical end portion 18, so that this portion 18 can slide through the opening 12. The funnel 6 has a downwardly projecting cylindrical clamping portion 19 with a ring-shaped barb 20 which clamps a ring-cylinder 21. The upper end 22 of the ring-cylinder 21 pinches a sealing or O-ring 23. In FIG. 1 the upper rim 24 of the cylindrical end portion 18 is lying against O-ring 23, which is the closed position of a valve 25, that is formed by piston 13 with stem 17 and cylindrical end portion 18 and pinched sealing or O-ring 23.

The cup-like cylinder 15 is enclosed by a cylindrical clamping means 26 which comprises a cylindrical cup 27 which exactly surrounds the cup-like cylinder 15 and has an upper crown 28 with openings 29 between dents 30. The cup 27 has in its upper closing three vents 31, from which only one can be seen in FIGS. 1 and 2. Further, a number of L-shaped small projections or ribs 38 (shown more clearly in FIG. 10) are provided on the inside of the funnel 6 which are equally distanced from each other. The projections or ribs 38 are provided at the lateral and the bottom side of the funnel 6. Therefore, there is space between the cylindrical cup 27 and the funnel 6, which defines a passageway from opening 12 up to the upper side of the insert 5. The passageway provides a path for fluid communication from the second chamber 7, through the valve 25 and past the first chamber 16, as illustrated in FIG. 2 by arrows A.

Figure 8:
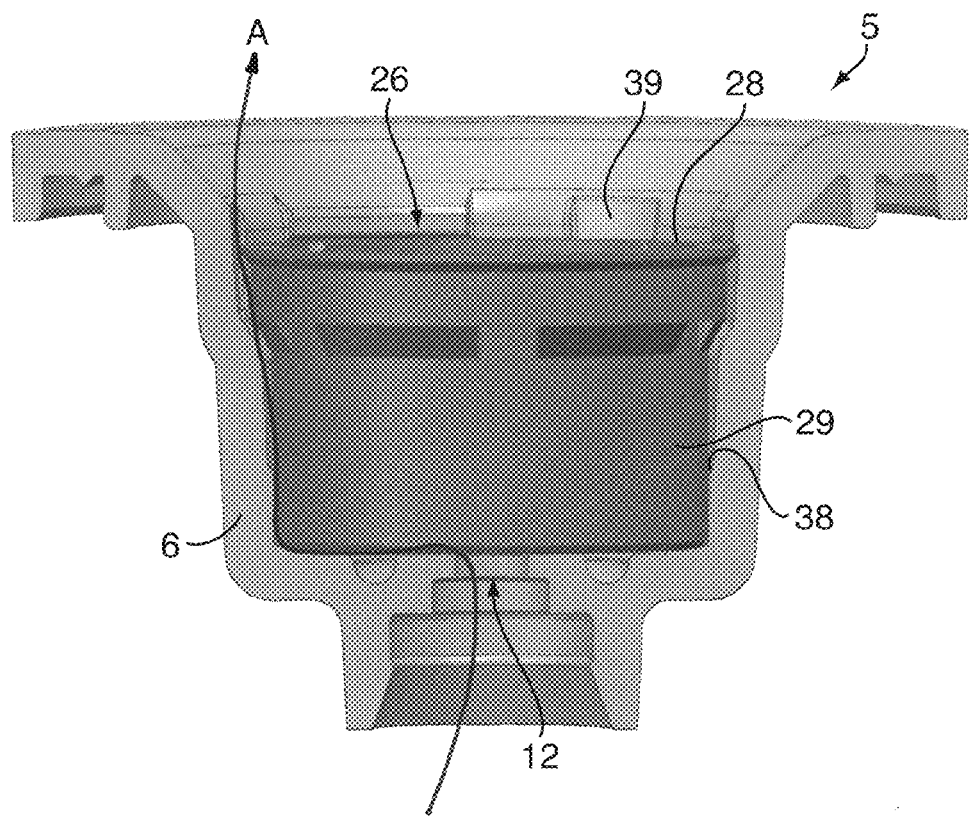
FIG. 8 illustrates a partial cross-sectional view of a ring shaped insert and cylindrical clamping means forming part of the pressure control device of FIG. 1.
Figure 9:
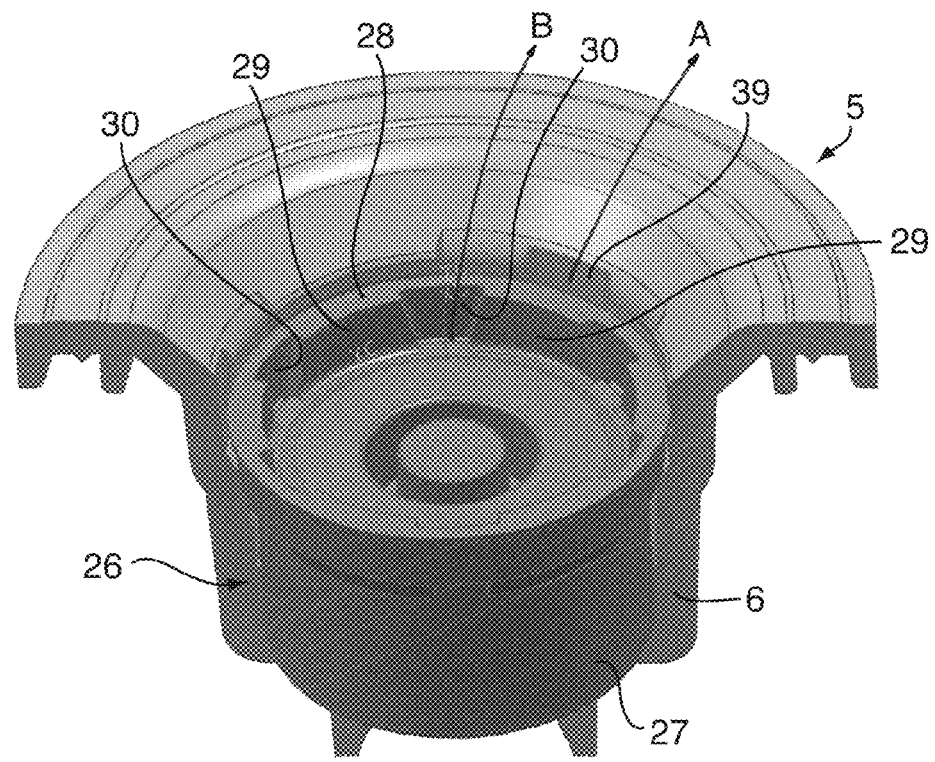
FIG. 9 illustrates a perspective, partial cross-sectional view of the insert and cylindrical clamping means of FIG. 8.
Figure 10:
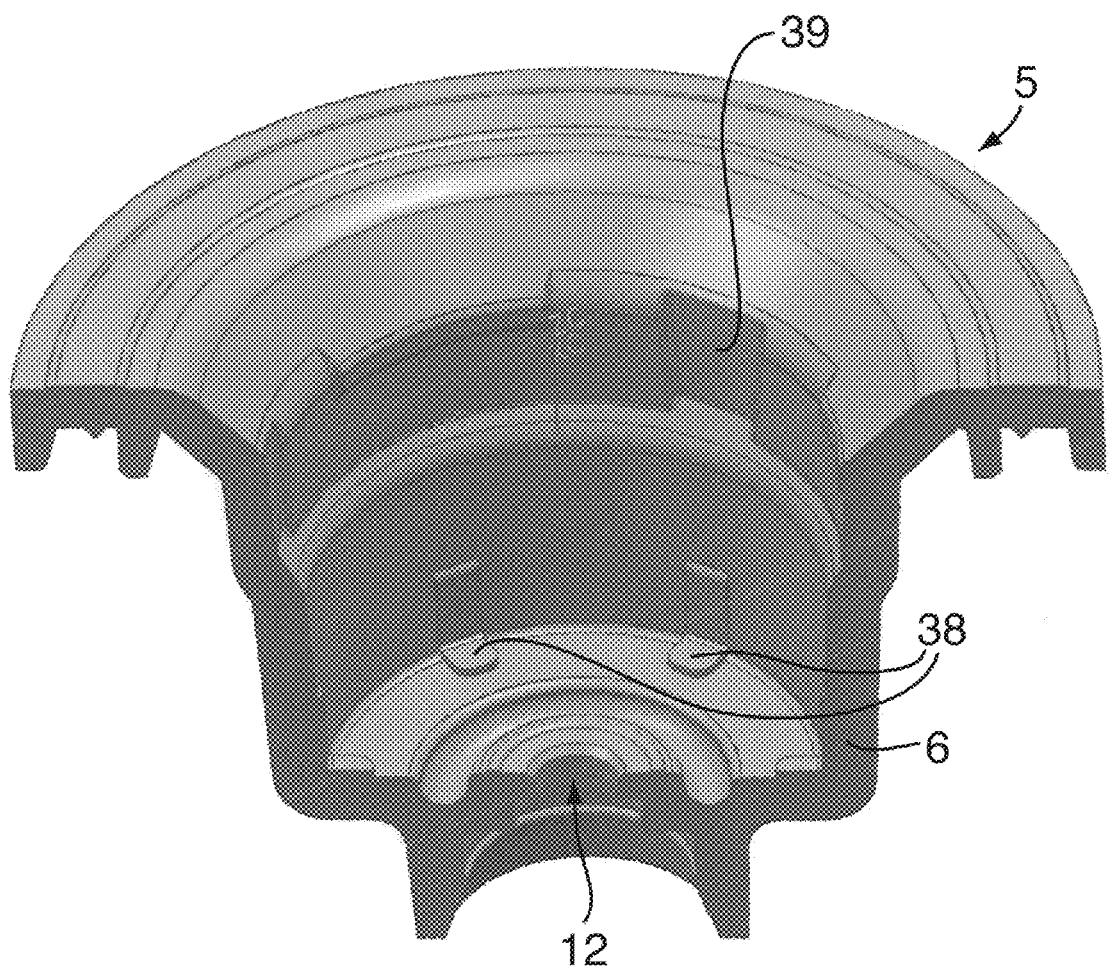
FIG. 10 illustrates a perspective, partial cross-sectional view of the insert of FIG. 8.

In FIGS. 8-10, the insert 5 and the cylindrical clamping means 26 are shown in cross-section and in perspective view. As shown, the cylindrical cup 27 sits on the L-shaped projections or ribs 38, leaving a space between the projections or ribs 38 through which fluid from the second chamber 7 can pass. As can also be seen more clearly, the inner surface of the insert 5 includes recesses 39 through which fluid from the second chamber 7 may pass, as illustrated by arrow A in FIG. 9. Fluid can also flow through the openings 29 in the crown 28 of the cylindrical clamping means 26, as illustrated by arrow B in FIG. 9.

Figure 5:
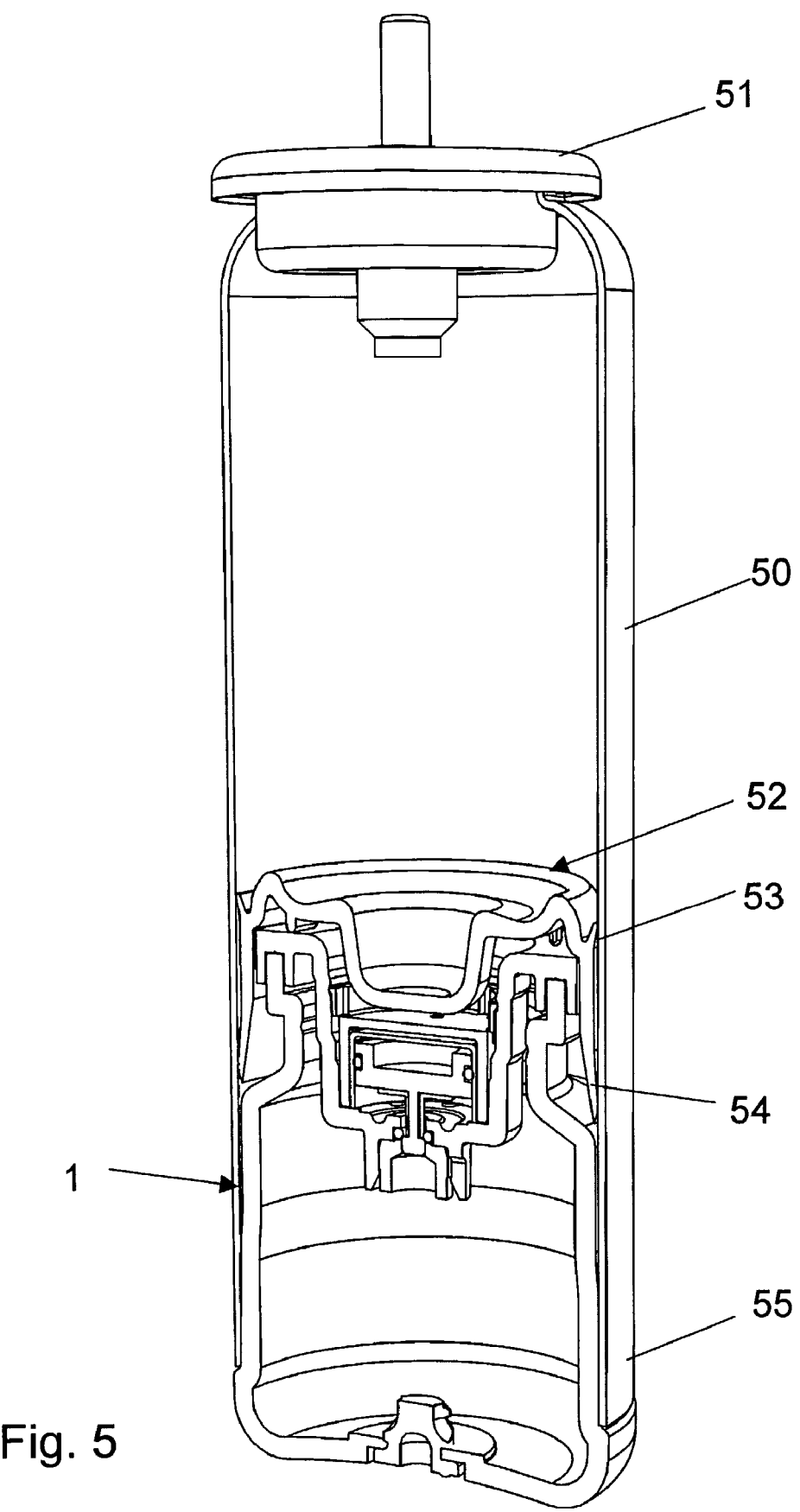
FIG. 5 illustrates a fluid dispensing container with a pressure control device and a movable piston in accordance with an embodiment of the present invention, wherein the valve is closed.
Figure 6:
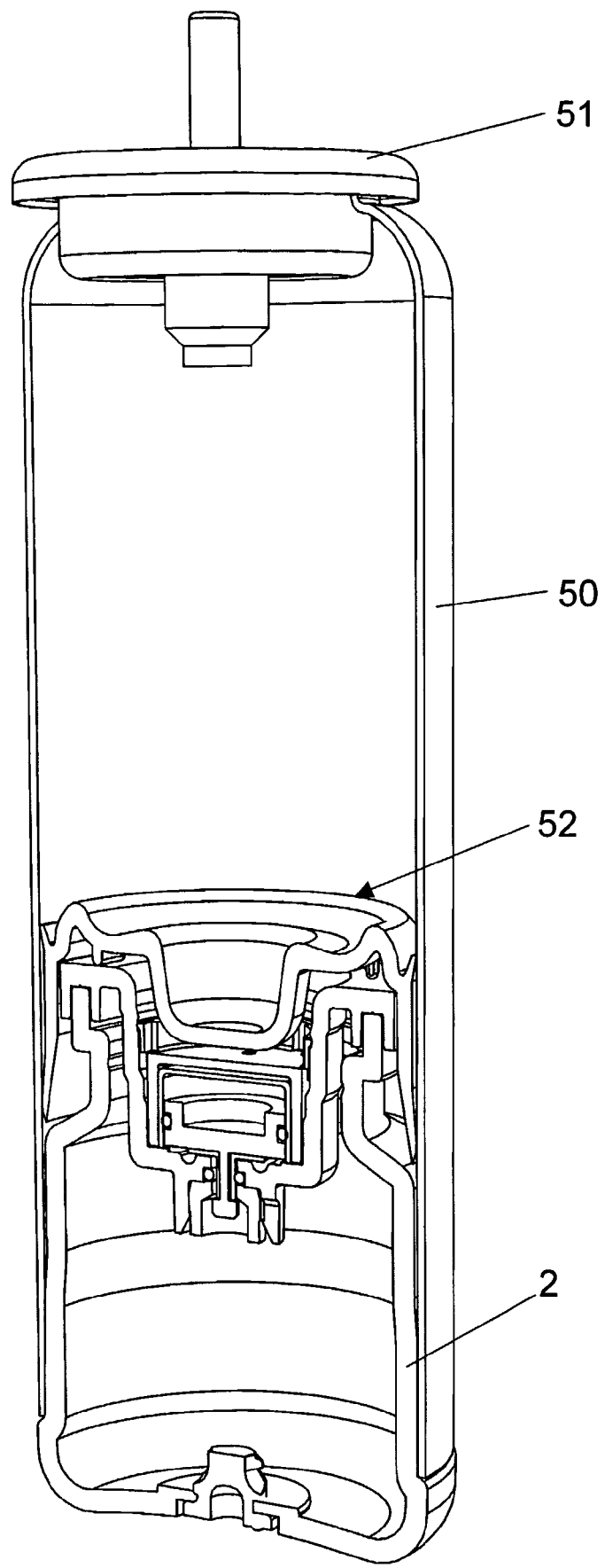
FIG. 6 illustrates the fluid dispensing container of FIG. 5, wherein the valve is open.

The cylinder 2 is widened gradually towards its end and has a broader end portion 32 with an inwardly projecting rim 33 on which the end portion of a container rests (see FIGS. 5 and 6). The bottom part 34 of the cylinder has a ring-shaped depression 35, which is reinforced at the inner side of the cylinder 2, with a central opening 36, in which a so-called Nicholson plug 37 made of rubber is pressed. The bottom part 34 may have been reinforced by radial supporting ribs, in order to resist the deformation caused by the high pressure during elevated temperature storage conditions. Instead of a Nicholson plug other types of sealing elements can be used, e.g. an alternative type of a rubber bung, or mushroom shaped grommets or so called rubber rope seals, heat staking or use of a ball-bearing such as in cigarette lighters.

Figure 3:
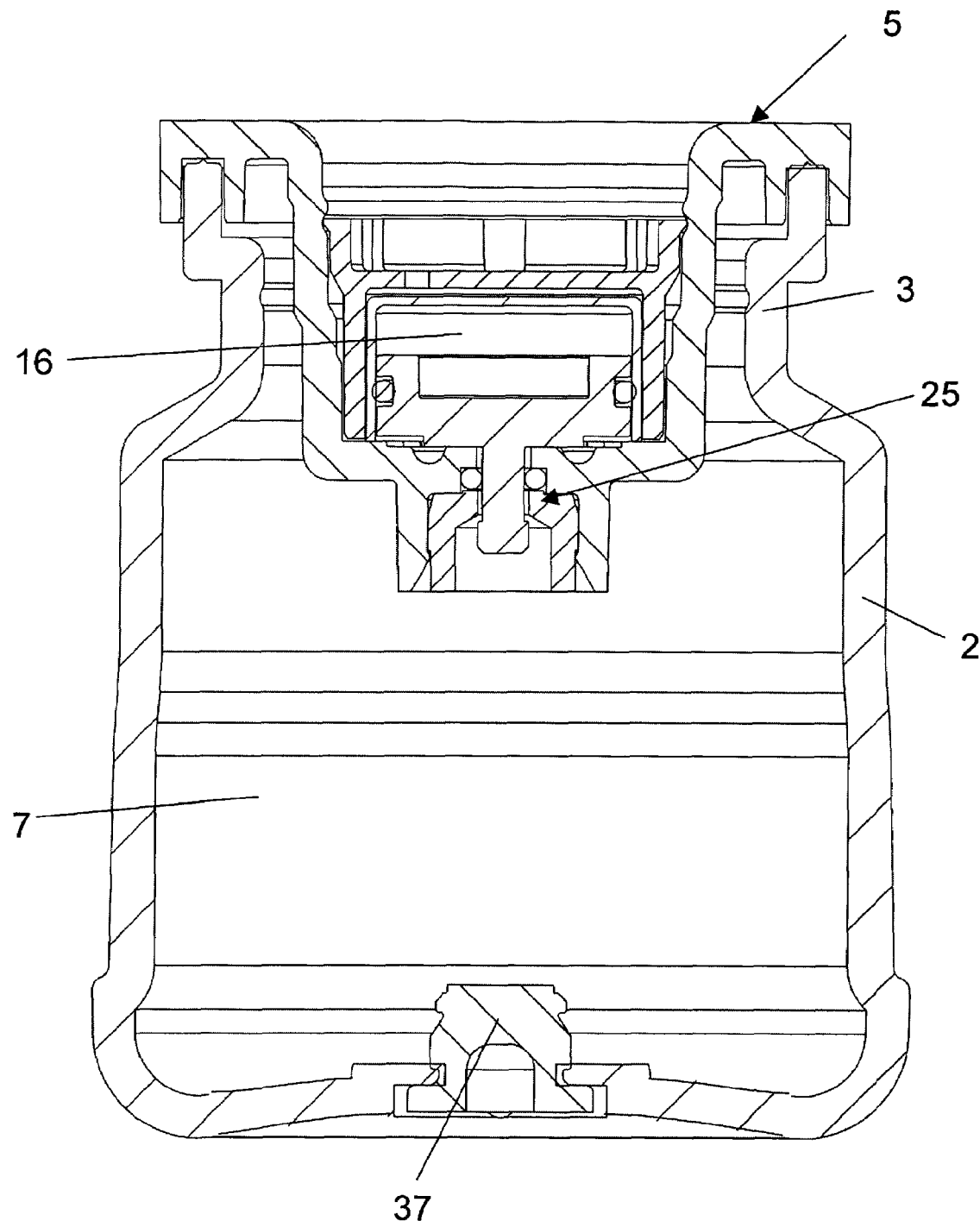
FIG. 3 illustrates the pressure control device of FIG. 1 only in cross-section.

FIG. 2 shows the valve 25 of the pressure control device 1 in the open position. FIG. 3 is a cross-section of the pressure control device 1 as depicted in FIG. 2.

Figure 4:
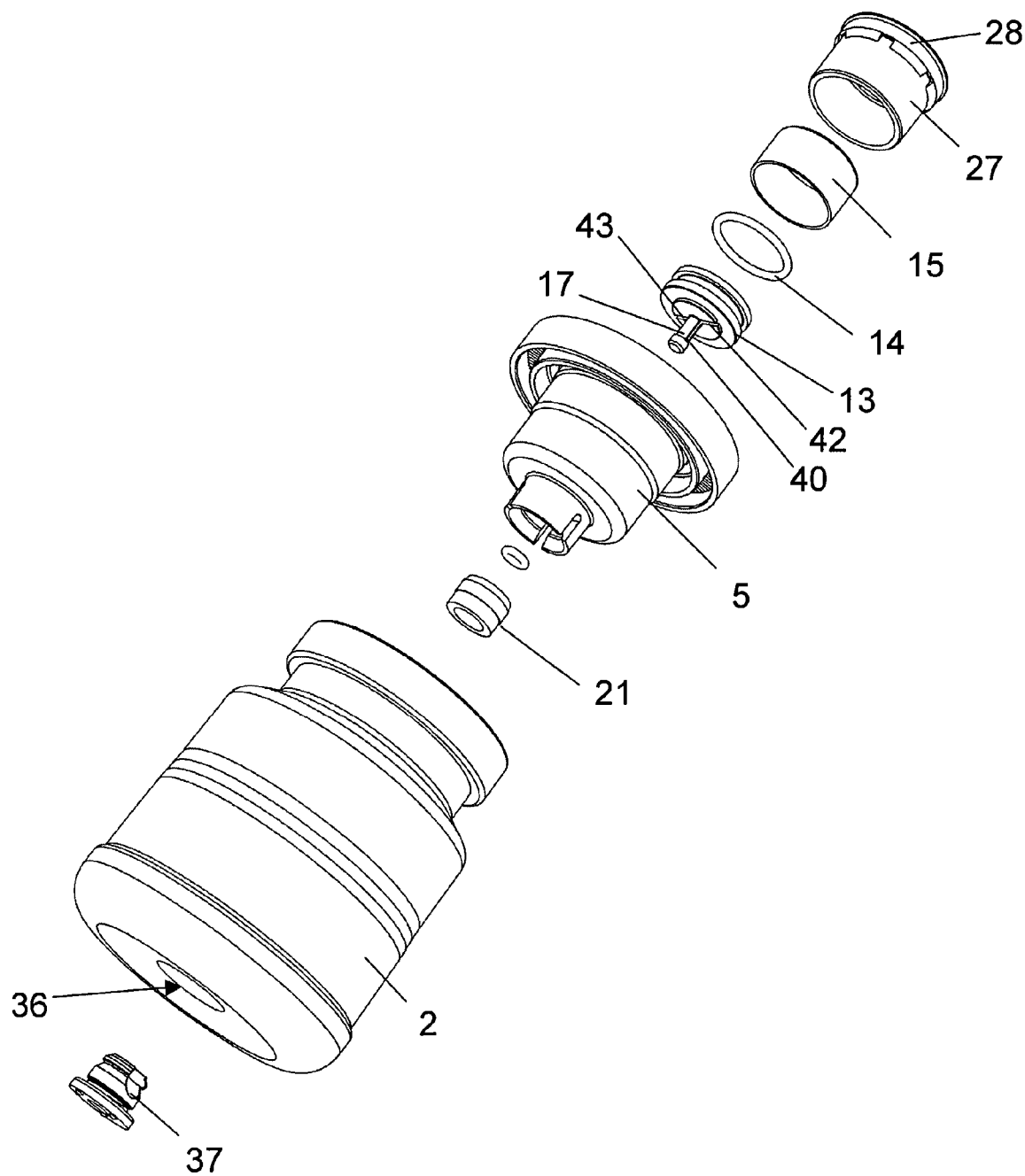
FIG. 4 illustrates an exploded view of the pressure control device of FIG. 1.

In FIG. 4 an exploded view of the elements of the pressure control device 1 is shown. Especially, the construction of the cup 27 with crown 28 can be seen more properly. One can further see that the stem 17 has two grooves 40 and 41, which are provided at opposite sides of the stem 17. In continuation of grooves 40 and 41 there are provided in opposite directions two grooves 42 and 43 at the underside of the piston 13. Thus, in the open position of valve 25, where the piston 13 is lying on the bottom side of the funnel 6, there is a passageway from the open valve 25 along the inner bottom side and the lateral side of funnel 6 around the cylindrical clamping means 26 and over and through the openings 29 of crown 28 up to the top of insert 5, as illustrated by arrows A and B in FIGS. 2, 8 and 9.

In FIG. 5 the pressure control device 1 is mounted in a container 50 having a per se known pressure valve 51 and a flexible piston 52 made of a suitable thermoplastic material such as high-density polyethylene which is movable within the container 50. The flexible piston 52 is formed as a cup-like cylinder or dome following more or less the upper contour of the insert 5. The piston 52 has further a broad ring-cylinder shaped sealing 53, which is contacting the inner wall of the container 50 with an upper sealing lip 53 and a lower sealing lip 54. The upper sealing lip 53 is provided as a scraper with a sharp rim so that the liquid filled in the container 50 will be scraped from inner wall of the container 50, so that no material or at most only a very thin liquid film remains at the inner wall. A separate rubber o-ring assembled around the piston 52 can also be considered where a gas tight seal is needed. The sealing lip 54 is wedge-shaped and has a somewhat larger contact area than the upper sealing lip 53. As can be seen the container 50 is formed as a bottle of cylindrical form. The cylinder 2 of the pressure control device 1 is widened to its end so that there is a interference press-fit connection between the inner side of the bottle 50 and the outer side of the cylinder 2. In addition in the neighborhood of the end portion 55 the bottle 50 is laser welded to the cylinder 2 providing a very strong and hermetic seal. Although a ring cylindrical bottle 50 is shown here, other bases like an ellipse or a quadrant can be used for the cylindrical bottle. The bottle can also be oval shaped. The shape of the cylinder 2 of the pressure control device 1 should then be adapted accordingly.

Working

The function of the above described pressure control device is as follows: in the second chamber 7 an inert gas, especially normal air, with an overpressure as required but preferably of around 8 bar is filled in. Valve 24 is in its closed position (FIG. 1). In the first chamber 16 a gas, especially normal air, with a constant predetermined excess pressure of 1.5 to 2.0 bar, preferably at 2.0 bar, is filled in. If the pressure in container 50 drops below the predetermined or excess pressure, which occurs if liquid in the container 50 is dispensed by valve 51, the pressure in the passageway also drops. Thus, there is no more pressure equilibrium between the first chamber 16 and the passageway, and the piston 13 is moved downwardly from the closed position of valve 25 (FIG. 1) to the open position (FIG. 2). Because there is an overpressure in the second chamber 7 of the cylinder 2, there will be an airflow over the passageway to the container 50, i.e. underneath the flexible piston 52 which will be moved upwards until there is pressure equilibrium again between the first chamber 16 and the passageway (or container 50). In the equilibrium situation the valve 25 is closed again and the pressure underneath and the pressure above the flexible piston 52 will be the same. The piston 13 is moved in a reciprocating or oscillating manner to open and close the valve 25 until the equilibrium situation is reached. Since piston 13 and stem 17 are light-weighted the reciprocating movement between the open and closed position of valve 25 is very fast, such that the equilibrium situation is reached almost immediately.

In order to dispense completely all fluid from the container at a constant pressure or continuous flow-rate an excess pressure must be upheld in the container until the end. This can only be afforded if at the end as the last bit of liquid should be dispensed the overpressure in the second chamber 7 is at least equal to the predetermined excess pressure of the first chamber 16. This means that following equation should be fulfilled:

$$P_2 \geq P_1 * (1 + V_1/V_2)$$

wherein
 $P_1$=the predetermined excess pressure
 $P_2$=the initial pressure in the second chamber
 $V_1$=the volume of the container
 $V_2$=the volume of the second chamber This means that the smaller the volume $V_2$ is with respect to the volume $V_1$, the higher is the overpressure $P_2$. Thus, since the design of the cylinder 2 is more critical at higher pressures there is a practical limit for the smallest size of cylinder 2 which depends on the material properties, the manufacturing methods, etc.

In a practical example the volume of the container $V_1$ is 150 ml, wherein the volume of the liquid to be dispensed is to a maximum of 90% of the container volume, i.e. 135 ml. The overpressure $P_2$ of the second chamber 7 is initially 8.0 bar and the working or predetermined excess pressure $P_1$ is 2.0 bar. The volume $V_2$ of the second chamber 7 is 50 ml.

The required working pressure $P_1$ is dependent on the viscosity and or other physical properties of the liquid to be dispensed. A typical working pressure needed for low or medium viscosity gel or cream (e.g. cosmetics) is 1.5 to 2.0 bar, for post-foaming gel in a pressurized formulation is 3.0 bar, for high viscosity filler (e.g. acrylic resin) is 2.0 to 2.5 bar, a wet liquid spray is 3.0 bar, a fine liquid spray is 4.0 to 5.0 bar, and a dry to very dry liquid spray is over 6.0 bar.

In the last case the overpressure $P_2$ is 24.0 bar if the volume $V_1$ of the container is 150 ml and the volume $V_2$ of the second chamber 7 is 50 ml. Therefore the construction of the cylinder 2 of the pressure control device 1 has to be very stable in order to withstand such high overpressures. Also the governmental regulations for pressurized containers must be fulfilled, which concerns the stability and choice of the material used for the cylinder 2, etc. Therefore, the process for producing the above described pressure control device 1 is also very important, which is described hereinafter.

Figure 7:
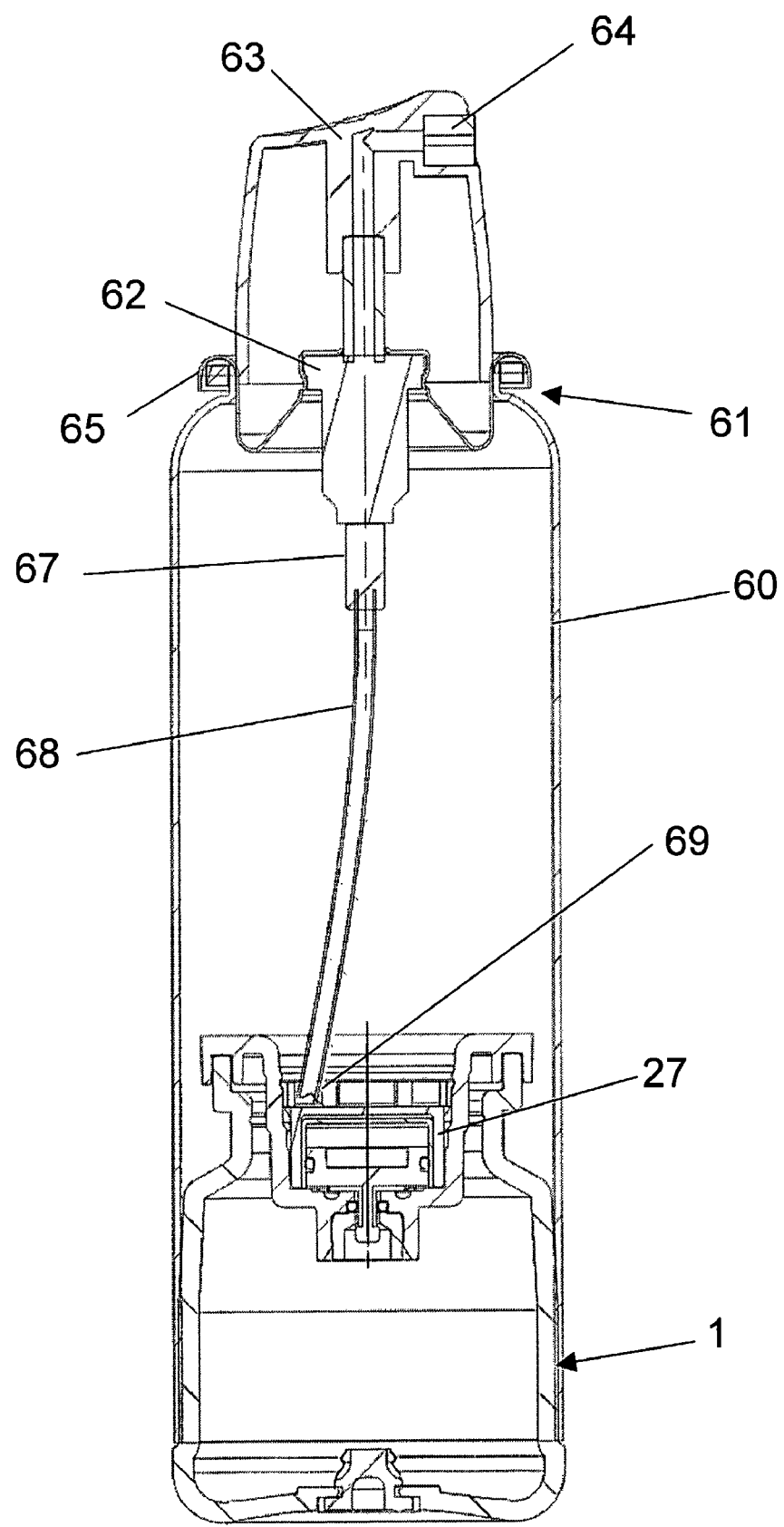
FIG. 7 illustrates a fluid dispensing container with a pressure control device and a spray valve with dip-tube arrangement in accordance with an embodiment of the present invention.

In FIG. 7 a fluid dispensing container 60 is shown in cross-section, in which the pressure control device 1 is mounted in a similar manner as in the container 50 of FIGS. 5 and 6. At the upper end 61 of the container 60 a conventional dispensing valve 62 with a push button actuator 63 comprising a spray nozzle 64 is mounted by circumferential ringshaped rim 65 which is crimped to the upper end 61. The lower end 67 of the valve 62 is provided with a hollow dip-tube 68 of a plastic material such as polypropylene or polyethylene. The length of the dip-tube 68 is long enough that the lower end 69 merely contacts the cylindrical cup 27 of the pressure control device 1 (cf. FIG. 1). The dip-tube may also be positioned in between the outside of the cylinder and the inside of the container wall.

The lower tube end 69 may be cut-off obliquely so that blocking thereof by a too close contact with the surface of the cylindrical cup 27 is prevented. The working of the container 60 is similar as for the container 50 of FIGS. 5 and 6.

It has been proven in a series of practical tests that the pressure in the container 50 or 60 remains constant independent from the filling rate, i.e. during dispensing the fluid product the predetermined excess pressure remains constant until all fluid is dispensed.

Clearly the container 50 with the flexible piston 52 is more suited for fluid with a higher viscosity like a cream or gel, whereas the container 60 with the spray nozzle 64 is more suited for low-viscosity fluid like airfresheners, deodorants, spray paints and the like.

Manufacturing Process

The cylinder 2 of the pressure control device 1 is preferably injection blow moulded from polyethylene terephthalate (PET). The main advantages of the injection blow moulding process for producing the cylinder 2 is that different sizes can be produced with the same tooling, or with minimal changes, and that the orientation of the stretched PET material during the blowing process leads to a higher crystalline structure which gives high strength and good gas barrier properties. It has been proved that the construction of the cylinder 2 with neck portion 3, flange 4 and widened or broader end portion 32 with a wall thickness of typically 1.5 to 2.0 mm is very strong and most suitable for containing high gas pressures.

The neck portion 3 remains the same for all sizes of the cylinder 2 which allows the efficient standardization of components and manufacturing processes and assembly equipment. The central opening or hole 35 is made in the bottom of the cylinder 2. This can be done by drilling or, which is more advantageous, during the injection blow moulding process in that the outer shape of the moulding tool has a pin at the bottom for shaping the central opening or hole 35. For the laser welding process mentioned above a tapered area on the outside diameter of the cylinder is provided in order to obtain an optimal interference press-fit with the container or bottle 50.

The other parts of insert 5, i.e. the funnel 6, the cup-like piston 13, the ring-cylinder 21 and the cylindrical clamping means 26, are made by injection moulding of any suitable synthetic material like PET or the like. The cup-like cylinder 15 made of aluminum is positioned at the correct position over the piston 13 with surrounding O-ring 14 under air pressure, and three of four inward indentations are made at the open end of the cylinder 15 to prevent escape of the piston 13. In this manner the first chamber 16 is maintained at the predetermined excess pressure. Thereinafter the cylindrical clamping means 26 is put over the cylinder 15, whereas the air between the cylinder 15 and the cylindrical cup 27 will escape through vents 31, and is snapped in position in the funnel 6. As can be seen in FIGS. 1 and 2, for this reason there is provided a small ring groove 60, in which outer ring parts 61 of the crown dents 30 can be snap fitted. Alternatively, the cup-like cylinder 15 can also be made of PET or any other hard synthetic material. Instead of indentations the outer edge of the cylinder 15 can be assembled into position by ultrasonic welding or some other suitable method.

The container or bottle 50 is injection stretch blow-moulded (ISBM) from a proper pre-form made of any suitable synthetic material like PET or the like. The PET pre-form has already the shape of a bottle in a smaller format. Pre-forms may first be made separately on very high output production scale and are therefore very economical. The ISBM process has the same advantages of the abovementioned injection blow-moulding process used for producing the cylinder 2, but with the additional important benefit in that the PET material is stretched bi-axially, that is both radially and lengthwise, which gives rise to even better stretch and gas barrier properties even with a thin wall thickness of typically 0.3 to 0.6 mm depending on the container design. After stretch blow-moulding the end part of the container bottle 50 may be cut-off to provide an open end for receiving the piston 52 and cylinder.

The flexible piston 52 is assembled into the bottle 50 and the bottle 50 with its open end portion 50 is put over the cylinder 2 of the pressure control device 1. In order to obtain a hermetic seal between the bottle 50 and the cylinder 2, the bottle 50 is laser-welded to the cylinder 2. For this reason the bottle 50 is made of a transparent plastic material like PET and the cylinder 2 is at least impregnated at a small distance from the bottle end portion 53 at a ring-cylindrical circumference with a infrared or laser energy absorbing material known as "carbon black". The bottle 50 with the cylinder 2 is turned over its longitudinal axis during a laser beam is directed perpendicularly towards the outer surface of the bottle 50. The used semiconductor laser equipment is the NOVALAS-C system of Leister Process Technologies, Sarnen, Switzerland with a wavelength of 820 nm. The power of the used laser beam was 25 Watt (continuous), the rotational speed was 3.5 revolutions/sec and the laser beam was applied during approximately 10 revolutions.

Although laser welding has been proven as giving the best results for joining the pressure control device to the bottle 50 other suitable joining methods, like ultrasonic welding or gluing with an appropriate plastic adhesive can also be used.

The main advantages of the described manufacturing method is that the pressure control device can be produced and its first chamber can be pressurized and delivered to the manufacturer of the container, and the manufacturer can produce the container or bottle by injection stretch blow-moulding, which is a standard known process, cut-off the bottom of the container or bottle, join the pressure control device with the bottle e.g. by laser welding, insert the pressure valve 51, fill in the liquid over the pressure valve 51, and finally pressurize the second cylinder through the rubber plug 37 in a conventional manner. The additional production steps can easily be introduced in the known production and filling processes for aerosol containers as used in cosmetics or the like, wherein e.g. the liquid product is filled in through the open neck of the container or through the dispensing valve 51.

A further advantage of the invention is that, since only normal air or any other suitable inert gas is used for the pressure filling, the process facilities, equipment and manufacturing environment and operating procedures do not need to take account of the special safety requirements normally needed for dangerous flammable propellants.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A pressure control device in a pressure control system for maintaining a constant predetermined excess pressure arranged in a fluid dispensing container, said pressure control device comprising:

a cylinder having an open end and a closed end, and a piston movable within said cylinder defining a first chamber to be filled with a gas for exerting said predetermined excess pressure, a second chamber, a passageway from the second chamber to the outside of the device leading to the fluid dispensing container, and a valve for releasing and closing said passageway, wherein the second chamber is formed by a high-pressure container with a closed end and an open end provided with a rim part and said high-pressure container being filled with a gas at a pressure higher than said predetermined excess pressure, said piston having means for actuating said valve dependent from the pressure difference between the first chamber and the fluid dispensing container, so that if the fluid pressure in the fluid dispensing container drops below the predetermined excess pressure, gas flows from the second chamber to the fluid dispensing container until the container pressure approximately equals said predetermined excess pressure, and further wherein a closure is mounted to the rim part of the high-pressure container in order to close the second chamber, wherein the first chamber is part of the closure, such that the high-pressure container encompasses the cylinder of the first chamber.

2. The pressure control device as claimed in claim 1, wherein the volume of the first chamber is substantially smaller that the volume of the second chamber.

3. The pressure control device as claimed in claim 1, wherein the high-pressure container is a second cylinder.

4. The pressure control device as claimed in claim 1, wherein the initial pressure of the gas in the second chamber is equal to or higher than the predetermined excess pressure in the first chamber multiplied by the sum of one and the quotient of the volume of the fluid dispensing chamber and the volume of the second chamber.

5. The pressure control device as claimed in claim 1, wherein the closure comprises a closing element commensurate to the rim part of the high-pressure container, and means for mounting the first cylinder of the first chamber in the closure.

6. The pressure control device as claimed in claim 5, wherein the upper end of the high-pressure container has a tapered neck portion.

7. The pressure control device as claimed in claim 6, wherein the closure comprises a steplike funnel directed inwardly to the neck portion.

8. The pressure control device as claimed in claim 5, wherein the closing element is an inner circular groove of the closure which is mounted to the rim part of the high-pressure container by means of vibration or ultrasonic welding.

9. The pressure control device as claimed in claim 1, wherein the high-pressure container has a central bottom opening locked by a plug for pressurizing the second chamber with a gas.

10. The pressure control device as claimed in claim 1, wherein the high-pressure container is made of a plastic material by injection blow moulding.

11. The pressure control device as claimed in claim 10, wherein the high-pressure container is made of PET.

12. A pressure control system comprising a pressure control device as claimed in claim 1, and a fluid dispensing container, wherein the fluid dispensing container is formed from a plastic material as a bottle and the high-pressure container is welded to the inner wall of the fluid dispensing container, whereas the inner side of the bottle and the outer side of the high-pressure container are adapted to form an interference press-fit connection.

13. The pressure control system as claimed in claim 12, wherein the high-pressure container is laser welded to the inner wall of the fluid dispensing container.

14. The pressure control system as claimed in claim 12, wherein the fluid dispensing container has a dispensing opening with a dispensing valve, and a movable piston is provided in the fluid dispensing container between the pressure control device and the dispensing opening, wherein said movable piston separates the fluid and the gas in the fluid dispensing container, and is movable towards the dispensing opening by the excess pressure prevailing in the fluid dispensing container.

15. The pressure control system as claimed in claim 14, wherein the movable piston is designed as a dome with annular sealing ribs.

16. The pressure control system as claimed in claim 15, wherein the movable piston is made of a resilient plastic material.

17. The pressure control system as claimed in claim 12, wherein the fluid dispensing container has a dispensing opening with a dispensing valve, and a dip-tube is provided from the entry of the dispensing valve to the upper end of the pressure control device, in order to dispense the fluid through the dip-tube by the excess pressure prevailing in the fluid dispensing container.

18. The pressure control system as claimed in claim 17, wherein the dispensing valve has a spray nozzle.

19. A method for manufacturing a pressure control device for use in a pressure control system for maintaining a constant predetermined excess pressure arranged in a fluid dispensing container, said pressure control device comprising a first cylinder having an open end and a closed end, and a piston movable within said cylinder defining a first chamber to be filled with a gas for exerting said predetermined excess pressure, a second chamber, a passageway from the second chamber to the outside of the device leading to the fluid dispensing container, and a valve for releasing and closing said passageway, wherein the second chamber is formed by a high-pressure container with a closed end and an open end provided with a rim part and said high-pressure container being filled with a gas at a pressure higher than said predetermined excess pressure, said piston having means for actuating said valve dependent from the pressure difference between the first chamber and the fluid dispensing container, so that if the fluid pressure in the fluid dispensing container drops below the predetermined excess pressure, gas flows from the second chamber to the fluid dispensing container until the container pressure approximately equals said predetermined excess pressure, and further wherein a closure is mounted to the rim part of the high-pressure container in order to close the second chamber, wherein the first chamber is part of the closure, such that the high-pressure container encompasses the cylinder of the first chamber, said manufacturing method comprising:

forming the first cylinder;

forming the piston, the valve elements, the high-pressure container with the closed end and the rim part at the open end, and the closure out of a synthetic material of high stability;

forming a central opening in the bottom of the high-pressure container;

assembling the piston with a sealing ring in the first cylinder, whereas a gas is filled in the first chamber at a predetermined pressure;

mounting the first cylinder with respect to the valve, such that the actuating means of the piston is positioned correctly with respect to the valve; and mounting the closure to the high-pressure container.

20. The manufacturing method as claimed in claim 19, wherein the closure is mounted to the high-pressure container by vibration or ultrasonic welding.

21. The manufacturing method as claimed in claim 19, wherein the high-pressure container is formed from a synthetic material by injection blow moulding.

22. The manufacturing method as claimed in claim 21, wherein the synthetic material is PET.

23. The manufacturing method as claimed in claim 19 comprising incorporating the pressure control device in a pressure control system including a fluid dispensing container wherein
the fluid dispensing container is formed;
the bottom of the fluid dispensing container is cut off; and
the high-pressure container and the fluid dispensing container are joined in their respective bottom regions.

24. The manufacturing method as claimed in claim 23, wherein the fluid dispensing container is formed from a synthetic material by injection stretch blow-moulding.

25. The manufacturing method as claimed in claim 23, wherein the high-pressure container and the fluid dispensing container are joined by laser welding.

26. The manufacturing method as claimed in claim 25, wherein the fluid dispensing container is made of a transparent plastic material and the high-pressure container is made of a laser energy absorbing plastic material.

27. The manufacturing method as claimed in claim 23, wherein the high-pressure container is pressurized with an inert gas immediately after filling the fluid dispensing container with a fluid.

* * * * *